INVENTOR
Douglas S. Love

BY James M. Mason
ATTORNEY

United States Patent Office 3,419,007
Patented Dec. 31, 1968

3,419,007
AMPOULE FOR USE WITH A NEEDLELESS HYPODERMIC INJECTOR
Douglas Stanley Love, Thornton Heath, Surrey, England, assignor to Express Injector Company Limited, Brighton, Sussex, England, a British company
Continuation-in-part of application Ser. No. 95,718, Mar. 14, 1961. This application Feb. 11, 1964, Ser. No. 344,150
Claims priority, application Great Britain, Feb. 18, 1963, 6,532/63; Jan. 31, 1964, 4,169/64
10 Claims. (Cl. 128—272)

ABSTRACT OF THE DISCLOSURE

An ampoule for use with a needleless hypodermic injector having: (1) a ductile, thin-walled metallic shell with a closed end and an open outwardly extending flanged outlet, (2) a plug inserted into said open shell outlet having a discharge orifice and an outwardly extending flange facing the corresponding flange of the shell and limiting entrance therein, and (3) a retaining ring fitting around the shell above the shell flange so that it grips the shell between ring and plug and makes it possible to introvert the shell by application of mechanical pressure.

---

Figure 1:
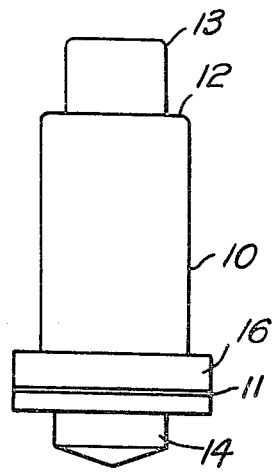

This application is a continuation-in-part of Ser. No. 95,718, filed Mar. 14, 1961, now U.S. Patent 3,131,692.

The present invention relates to ampoules for use with needleless hypodermic injectors.

Various proposals have been made over many years to provide needleless injectors operating on the principle of what is known as velocity injection. In this method of injecting medicinal substances beneath the skin of a patient, the liquid is caused to issue from the injector first at a very high velocity which brings about penetration of the skin by the stream of liquid, and then at a lower velocity at which the remainder of the dose to be injected continues to flow into the passage made by the high velocity stream. Provided that the stream of liquid is sufficiently small in cross sectional area, of the right velocity, and completely continuous, such needleless injectors can provide painless injection of medicinal substances and are free from the well-known drawbacks of injection by needle. They are particularly suitable for mass inoculation when a large number of human beings or animals have to be inoculated in succession.

In proposals made heretofore, the liquid to be injected has been contained in an ampoule of soft material such as rubber or tin which is inserted in an injector provided with a piston which impinges onto the closed end of the ampoule with great force and brings about the ejection of the liquid by introversion of the ampoule. It has hitherto been thought necessary to make the ampoule out of a soft material so that it could undergo the deformation of introversion without splitting.

It has now been realised by the present applicants that the faults in hitherto proposed systems, as a result of which they have never found a regular place in medicine, are caused by and spring from the idea that the ampoule must be made of soft material. It is now realised that the use of rubber or other soft material absorbs energy from the actuating mechanism of the injector and then re-transmits it to the liquid to break up the stream into spasmodic shock waves. The resulting discontinuity in the injected stream causes unsatisfactory results of injection.

A further difficulty with ampoules made of soft material is that they are liable to lose liquid on storage due to being subjected to accidental pressures. It is highly desirable that the ampoules should be made of material which supports itself so that liquid is not forced out in handling.

Furthermore for satisfactory manufacture on a large scale uniformity from ampoule to ampoule is necessary to give satisfactory injections over a range of subjects.

It has been found that the above mentioned disadvantages of prior proposals can be overcome by making at least that part of the ampoule which is subject to deformity on introversion of a sufficiently hard material that had specified mechanical properties defined as follows:

| | |
|---|---|
| Ultimate tensile stress | 30 to 42 long ton/in.$^2$. |
| Shear stress | 7 to 10 long ton/in.$^2$ at yield, maximum 28 to 40 long ton/in.$^2$. |
| Elongation | From 40% to 70%. |
| Hardness | From 130 to 190 Brinnell hardness values. |
| Yield stress | 0.5% proof stress at least 12 ton/in.$^2$ in the softened condition. |

Steel alloys, sold by Messrs. Firth-Vickers Stainless Steel Limited as "Staybrite" F.S.L., D.D.Q. and F.S.Q. steels, conforming also to British Standard Specification 970:1955, En. 58D and 58E, have been found most convenient for use. These are stainless steels, i.e. austenitic steels of high nickel and chromium content, having high resistance to corrosion. The steels particularly useful from the point of view of manufacturing for this purpose will lend themselves to cold drawing and usually have a nickel content between 8% and 14% and a chromium content between 11% and 20%.

Other materials and compositions of materials, for instance alloys containing transitional elements with or without iron as a substantial component, that have substantially the above defined mechanical properties, are suitable for making the introvertible part of the ampoule.

It is well known in the art of making pharmaceutical preparations that the container for the medicament must be resistant to corrosion by its contents and must be compatible with the same. Those materials which are being therefore used to make the introvertible part of the ampoule, and materials used to make any other part of the ampoule, may either inherently have such properties of resistance and compatibility in this respect, or may be rendered to have such properties for instance by coating with a material having the said properties wherever they are in contact with the injectable liquid.

The ampoules of the present invention may take any suitable form, depending on the construction of the injector to which they are adapted. In the specifications of British patent applications 10,353/60 and 13,038/61 we have described forms of injectors operating on the principles described above, and there will now be described various forms of ampoule for use with these types of injector. The ampoules made according to the invention may however, be used in any other type of injector adapted to the shape of the ampoule and working on the same or similar principle.

In order that the invention may be more readily understood reference will be made to FIGS. 1 to 10 of the accompanying drawings which illustrate by way of example preferred embodiments thereof.

Figure 3:
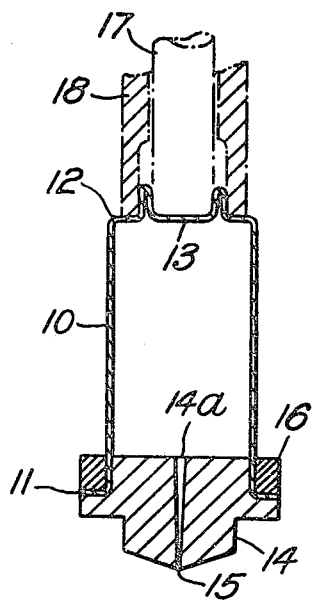
Figure 2:
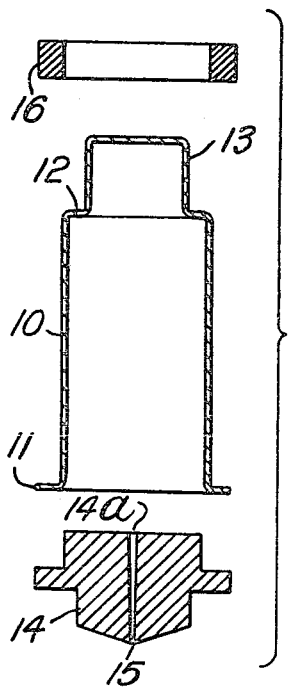
Figure 4:
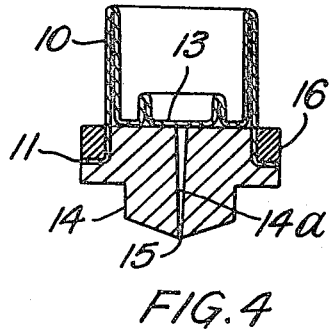
Figure 5:
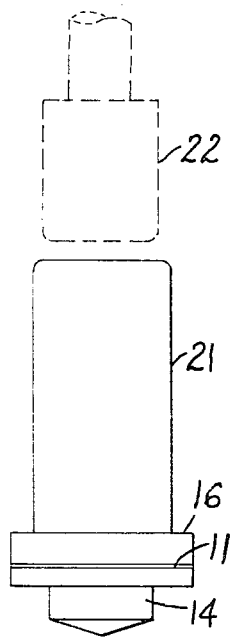
Figure 7:
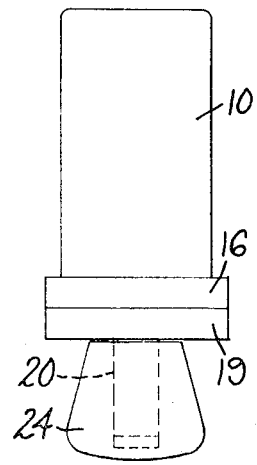
Figure 9:
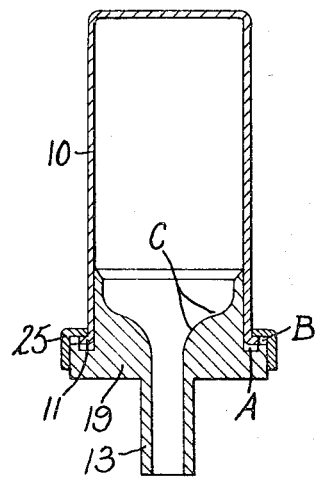
Figure 6:
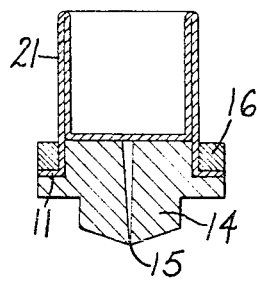
Figure 8:
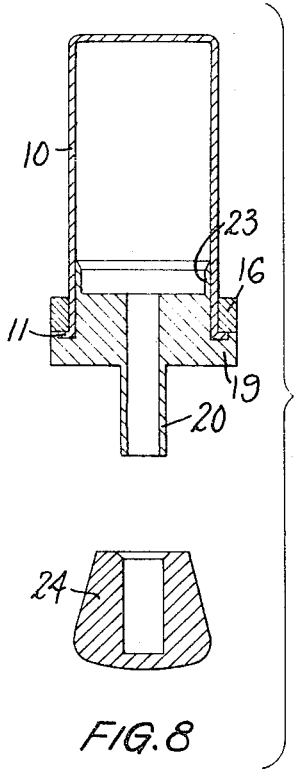
Figure 10:
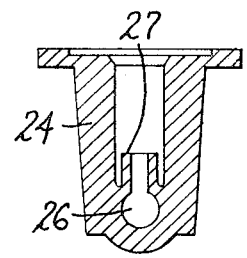

In the drawings:

FIG. 1 is an elevation of an ampoule on an enlarged scale with its parts assembled, FIG. 2 is an exploded section of FIG. 1, FIG. 3 is a section showing the ampoule after the first stage of introversion, FIG. 4 is a section showing the ampoule after the second stage of introversion has been completed, FIG. 5 is an elevation of a modified form of ampoule on an enlarged scale, FIG. 6 is a section though the ampoule shown in FIG. 5 after the introversion has been completed, FIG. 7 is an elevation of a further type of ampoule according to the present invention on an enlarged scale with its parts assembled, FIG. 8 is a sectional view of FIG. 7 but showing the sealing cap displaced from the ampoule, FIG. 9 shows a sectional view of a modification of the ampoule shown in FIG. 7 and FIG. 10 is an alternative form of sealing cap to that shown in FIG. 8.

Referring to the drawings the cylindrical shell 10 may be made of "Staybrite" stainless steel F.S.L. 0.003 in. thick, and is provided at its open end with outwardly extending flange 11. The closed end of the shell is stepped at 12 to provide a part 13 of reduced cross section. The shell is adapted to be closed by a plug 14 having an outwardly extended flange facing the corresponding flange of the shell and also having a minute discharge orifice 15.

The discharge orifice is fed through a central bore 14a in the plug which is tapered from the inner to the outer end of the plug. The outer end of the plug is shaped as a shallow inverted cone having its axis coincident with that of the discharge orifice. The plug 14 is inserted in the shell after the latter has been charged with medicament, and is retained firmly in place by the ring 16 which is arranged to have a slight interference fit over the shell 10, so that when forced thereover the shell is gripped between the plug 14 and the ring 16.

The ampoule is intended for use with an injector such as is described in the specification of British patent application No. 10,353/60. This injector is provided with a socket end into which the ampoule can be fitted, and with two plungers one of which, shown in chain lines 17 in FIG. 3, is adapted to engage the closed end of the part 13 of the ampoule and the other of which, shown in chain lines 18, is in the form of a sleeve surrounding said first plunger and adapted to engage the step 12.

In operation the inner or central plunger is actuated in advance of the outer plunger to engage the closed end of the part 13 and cause this to be introverted into the condition shown in FIG. 3. After the inner plunger 17 has moved into the position shown in FIG. 3 it picks up the outer plunger 18 and thereafter the two plungers move together, the outer plunger engaging the step 12 and introverting the adjacent and unreduced part of the shell into the remainder thereof, until finally the shell is pressed into the condition shown in FIG. 4. In this position all the liquid in the ampoule has been expelled through the discharge orifice 15.

The two stage introversion of the ampoule enables the liquid therein to be discharged in two pressure stages, the first part of the discharge being under sufficient pressure to penetrate the skin of the patient and the second stage being under lesser pressure so as not to damage subcutaneous tissues. Since once the skin has been penetrated it is desirable that pressure should be reduced, the first stage is relatively short, its actual duration being determined by the axial length of the part 13 which can be selected to suit particular requirements.

For the purposes of the present invention the shell of the ampoule may have any shape which is suitable for deformity and introversion, depending on the shape of the socket of the injector. Shells which have an axis of symmetry and are circular in cross section perpendicular to the axis, and in particular shells substantially cylindrical in shape have been found convenient for use.

Thickness of the wall of the shell may vary according to the type of material used, the size of the ampoule and the type of the injector, and is usually between 0.0015 in. and 0.006 in., preferably around 0.0025 in. The size of the ampoule is limited only by medical considerations; for all practical purpose ampoules having a volume between 0.1 ml. and 1.0 ml. have been found satisfactory in use.

FIGS. 5 and 6 illustrate a modified embodiment of the invention in which the ampoule is of uniform diameter from end to end. The ampoule is similar to that previously described with reference to FIGS. 1 to 4 except that the closed end of the shell 21 is not reduced in cross section.

The ampoule is intended for use in an injector provided with a socket into which the ampoule can be fitted and with a single plunger shown in chain lines 22 in FIG. 5, adapted to engage the closed end of the shell 21 and to introvert the capsule into the condition shown in FIG. 6.

The ampoule illustrated in FIGS. 5 and 6 is suitable for subcutaneous injections, the primary pressure required to pierce a hole in the skin being obtained solely from the impact of the plunger when this strikes the ampoule. After the impact and the initial high pressure discharge of liquid from the discharge orifice, the pressure under which the remainder of the liquid in the capsule is discharged is automatically reduced due to the initial displacement of the liquid from the capsule.

In an alternative embodiment shown in FIGS. 7 and 8 the cylindrical shell 10 is made of "Staybrite" stainless steel type F.S.L. 0.0025 in. thick and is provided at its open end with an outwardly extending flange 11. The shell is adapted to be closed by a plug 19 provided with a comparatively large orifice extending as a tubular, preferably thin-walled, projection 20 which is shaped for fitting into the nozzle of a needleless hypodermic injector.

In the embodiment described in relation to FIGS. 1 to 6 the plug has been provided with a minute discharge orifice, but in the present embodiment the discharge orifice is comparatively large and the minute orifice which ensures that medicament is discharged at high pressure is formed in the nozzle of the injector.

The plug 19 may be inserted in the shell 10 after the latter has been charged with medicament, and is retained firmly in place by the ring 16 which is arranged to have a slight interference fit over the shell 10, so that when forced thereover the shell is gripped between the plug 19 and the ring 16.

The wall of the tubular projection 20 may be made fairly thin, so that when the ampoule is fitted to an injector and introverted, the pressure on the medicament within the shell forces the said wall into sealing contact with the inside wall of the nozzle.

The inner end of the plug 19 is also provided with a short tubular projection 23 which engages the inside of the shell 10. This projection 23 may likewise be thin walled, so that when the ampoule is supported within an injector and the medicament therein is subjected to fluid pressure, the projection 23 is pressed into sealing engagement with the shell.

A further modification of the ampoule of the present invention is shown in FIG. 9. The cylindrical shell 10 is provided with a flange 11 as already described and is fitted with plug 19, which has a rheologically advantageous shape at C as shown in the drawing to facilitate air-free filling of the ampoule and a laminar flow form to the discharging liquid.

For an ampoule of volume 0.5 ml., the shell 10 may have 0.315 in. outside diameter and 0.455 in. length from the end to the narrower shoulder C, and made of 0.003 in. thick stainless steel containing 18.5% chromium and 10.0% nickel to specification EN58E.

The plug 19 may be held within the shell 10 by a retaining ring 25 of stainless steel or plastic or of any other material of similar strength. It is dimensioned to give an interference fit with both the plug 19 and the shell 10, and serves to give lateral support to the plug 19 to prevent it spreading under the pressure of the discharge. The components of the assembled and filled ampoule are in the positions shown in this drawing with spaces A and B left between them. When the ampoule is placed in the injector and the nozzle of the latter is screwed on, the plug 19 is pressed down into the retaining ring 25 to close spaces A and B. This action causes a displacement of liquid in the shell 10 and forces a priming charge of liquid into the nozzle of the injector.

In FIG. 10 is shown a modified form of sealing cap such as is shown at 24 in FIG. 8. The form shown in FIG. 10 is provided with an inner compartment 26 connected to the outside through a projecting passageway 27, which, on assembly onto the ampoule, projects into the tubular portion 20 of the plug 19. The purpose of the compartment 26 is to take up any air accidentally entrapped in the ampoule during the filling operation and to retain it so that it cannot return into the shell 10. In this way difficulties of injection which would otherwise be caused by the presence of air included in the ampoule can be prevented.

What I claim is:

1. An ampoule for use with a needleless hypodermic injector comprising:
   (a) a ductile, thin-walled, metallic shell having a closed end and an open end with an outwardly extending flange, said shell being capable of introversion by application of a high order of mechanical pressure to the closed end thereof and having the mechanical characteristics of an ultimate tensile strength of 30–42 long ton/in.$^2$, a shear strength of 7–10 long ton/in.$^2$ at yield and a maximum of 28–40 long ton/in.$^2$, an elongation of 40–70%, a Brinnell hardness value of 130–190, and a yield stress, as 0.5% proof stress, at least 12 long ton/in.$^2$ in the softened condition;
   (b) a plug inserted into said open end shell outlet thereby closing said shell, said plug having a discharge orifice and an outwardly extending flange facing the corresponding flange of said shell whereby insertion in said shell is limited and
   (c) a retaining ring fitting around said shell above said shell flange whereby said shell flange is gripped between said ring and said flange of said shell.

2. The ampoule of claim 1 wherein the shell is composed of stainless steel.

3. The ampoule of claim 2 wherein the shell has a nickel content of 8–14% and a chromium content of 11–20%.

4. The ampoule of claim 2 wherein the shell wall has a thickness of 0.0015 to 0.006 in.

5. The ampoule of claim 2 wherein the shell has a nickel content of 10%, a chromium content of 18.5%, and a thickness of 0.003 in.

6. The ampoule of claim 2 wherein the shell has a volume of 0.1 to 1 ml.

7. The ampoule of claim 2 wherein the discharge orifice of the plug is a minute opening of a central bore in the plug tapered from the end of said bore facing the shell and the end of said plug is a shallow inverted cone having an axis coincident with said discharge orifice.

8. The ampoule of claim 2 wherein the plug is provided with a short tubular projection which engages the inside of the shell and the discharge orifice is a comparatively large central bore extending as a tubular projection from the end of said bore not facing the shell, said tubular projection being adapted for fitting into a nozzle having a minute orifice for needleless hypodermic injection.

9. The ampoule of claim 8 wherein the plug has a curved, streamlined, cup-like opening facing the shell and leading into the tubular bore of said shell.

10. The ampoule of claim 2 wherein the closed end of the shell is stepped to provide a section of reduced cross section whereby said shell is capable of two stage introversion by application of a high order of mechanical pressure to the closed end section of reduced cross section followed by application of pressure to the remaining section of larger diameter.

References Cited

UNITED STATES PATENTS

| | | | |
|---|---|---|---|
| 1,207,393 | 12/1916 | Gammeter | 222—95 |
| 1,235,550 | 8/1917 | Carmody | 222—386.5 |
| 2,514,575 | 7/1950 | Hein | 128—218 |
| 2,670,121 | 2/1954 | Scherer et al. | 128—272 |
| 2,691,374 | 10/1954 | McKibbin et al. | 128—272 |
| 2,882,902 | 4/1959 | Juncher | 128—272 |

DALTON L. TRULUCK, *Primary Examiner.*

U.S. Cl. X.R.

220—44